(12) United States Patent
Carlin et al.

(10) Patent No.: US 11,753,947 B2
(45) Date of Patent: Sep. 12, 2023

(54) METHOD FOR MANUFACTURING A PART MADE FROM CMC

(71) Applicant: Safran Ceramics, Le Haillan (FR)

(72) Inventors: Maxime François Roger Carlin, Moissy-Cramayel (FR); Nicolas Eberling-Fux, Moissy-Cramayel (FR); Eddy Goullianne, Moissy-Cramayel (FR); Thierry Guy Xavier Tesson, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 450 days.

(21) Appl. No.: 16/649,329

(22) PCT Filed: Sep. 13, 2018

(86) PCT No.: PCT/FR2018/052254
§ 371 (c)(1),
(2) Date: Mar. 20, 2020

(87) PCT Pub. No.: WO2019/058046
PCT Pub. Date: Mar. 28, 2019

(65) Prior Publication Data
US 2020/0255344 A1    Aug. 13, 2020

(30) Foreign Application Priority Data
Sep. 21, 2017   (FR) ........................ 1758751

(51) Int. Cl.
*C04B 35/80* (2006.01)
*F01D 5/28* (2006.01)
(Continued)

(52) U.S. Cl.
CPC ............ *F01D 5/282* (2013.01); *C04B 35/563* (2013.01); *C04B 35/5611* (2013.01);
(Continued)

(58) Field of Classification Search
CPC . C04B 35/62844; C04B 35/80; C04B 41/009; C04B 2235/5256;
(Continued)

(56) References Cited

U.S. PATENT DOCUMENTS 9,080,463 B2 * 7/2015 Denece ................ F01D 25/246
9,528,443 B2 * 12/2016 Razzell ................ F01D 11/122
(Continued)

FOREIGN PATENT DOCUMENTS

CA      2860140 A1     7/2013
CN    103148764 A  *  6/2013  .............. G01B 5/14
(Continued)

OTHER PUBLICATIONS

Russian Search Report issued in Russian Application No. RU2020112740 dated Nov. 26, 2021 (2 pages).
(Continued)

*Primary Examiner* — Noah S Wiese
(74) *Attorney, Agent, or Firm* — Bookoff McAndrews, PLLC

(57) ABSTRACT

Method for manufacturing a CMC, i.e. ceramic matrix composite material, part provided with at least one cutout, as well as to such a CMC part provided with at least one cutout, the method comprising the following steps:
providing (E1) a fibrous reinforcement (10),
forming (E2') a cavity in a portion of the fibrous reinforcement (10),
injecting (E3) a slip comprising at least a ceramic powder and a solvent, the slip being injected so as to impregnate the fibrous reinforcement (10') and to fill the cavity of the fibrous reinforcement (10'),
drying (E4) the obtained assembly,
carrying out a densification (E6) by infiltration of a liquid densification material and solidification of said densification material,
(Continued)

machining (E7) at least one cutout in the obtained blank (30) within the volume corresponding to the cavity of the fibrous reinforcement (10).

14 Claims, 5 Drawing Sheets

(51) Int. Cl.
| | |
|---|---|
| C04B 35/628 | (2006.01) |
| C04B 41/00 | (2006.01) |
| F23R 3/00 | (2006.01) |
| C04B 35/56 | (2006.01) |
| C04B 35/563 | (2006.01) |
| C04B 35/573 | (2006.01) |
| C04B 35/58 | (2006.01) |
| C04B 35/583 | (2006.01) |
| C04B 35/584 | (2006.01) |

(52) U.S. Cl.
CPC ........ *C04B 35/5622* (2013.01); *C04B 35/573* (2013.01); *C04B 35/583* (2013.01); *C04B 35/584* (2013.01); *C04B 35/58092* (2013.01); *C04B 35/62844* (2013.01); *C04B 35/80* (2013.01); *C04B 41/009* (2013.01); *F01D 5/284* (2013.01); *F23R 3/002* (2013.01); *C04B 2235/5256* (2013.01); *C04B 2235/606* (2013.01); *C04B 2235/612* (2013.01); *C04B 2235/616* (2013.01)

(58) Field of Classification Search
CPC ........ C04B 2235/606; C04B 2235/612; C04B 2235/616; C04B 2235/945; F23R 3/002; F05D 2300/6033
See application file for complete search history.

(56) References Cited

U.S. PATENT DOCUMENTS

| | | | |
|---|---|---|---|
| 2013/0167374 A1 | 7/2013 | Kirby et al. | |
| 2013/0255278 A1* | 10/2013 | Razzell | ................ F01D 11/122 |
| | | | 60/806 |

FOREIGN PATENT DOCUMENTS

| | | | | |
|---|---|---|---|---|
| EP | 0303552 A2 | 2/1989 | | |
| EP | 3050863 A1 | 8/2016 | | |
| JP | 2017053345 A | 3/2017 | | |
| RU | 2622067 C1 | 6/2017 | | |
| SU | 1838280 A3 | 8/1993 | | |
| WO | WO-0106096 A1 * | 1/2001 | ............. | F01D 5/145 |
| WO | WO 2010/103213 A1 | 9/2010 | | |
| WO | WO-2010103213 A1 * | 9/2010 | ........... | D03D 25/005 |
| WO | WO 2011/070294 A1 | 6/2011 | | |
| WO | WO 2016/001343 A1 | 1/2016 | | |
| WO | WO-2016001343 A1 * | 1/2016 | ........... | C04B 35/565 |
| WO | WO 2016/133990 A1 | 8/2016 | | |
| WO | 2017060601 A | 4/2017 | | |

OTHER PUBLICATIONS

Russian Official Action issued in Russian Application No. RU2020112740 dated Nov. 26, 2021 (6 pages).
Office Action for Indian Patent Application No. 202017012136 dated Mar. 2, 2022 (7 Pages).
International Search Report in International Application No. PCT/FR2018/052254 dated Dec. 4, 2018 (3 pages).

* cited by examiner

METHOD FOR MANUFACTURING A PART MADE FROM CMC

CROSS-REFERENCE TO RELATED APPLICATION(S)

This patent application is the U.S. National Phase Entry under 35 U.S.C. § 371 of International Application No. PCT/FR2018/052254, filed on Sep. 13, 2018, which claims priority to French Patent Application No. 1758751, filed on Sep. 21, 2017.

FIELD OF THE INVENTION

The present disclosure relates to a method for manufacturing a CMC, i.e. ceramic matrix composite material, part provided with at least one cutout, as well as to such a CMC part provided with at least one cutout.

Such a manufacturing method can be in particular used in the aeronautical field in order to manufacture parts capable of withstanding high temperatures. This may be in particular sectors of a cylindrical member of a turbomachine, such as an aircraft turbojet engine, and more particularly sectors of a turbine ring, just to name few examples.

STATE OF THE PRIOR ART

The turbojet engine turbines comprise a ring that allows producing the outer flowpath of the turbine. Conventionally, this ring is divided into several sectors assembled next to each other so as to form a complete ring. Therefore, in order to ensure the sealing of the ring, grooves are made on the intersector faces of each sector and metal tabs are inserted in these grooves in order to connect the sectors two by two.

Due to the very high temperatures prevailing in these turbines, the ring sectors are made of CMC. The metal tabs are for their part generally made of a nickel or cobalt base alloy or based on other materials, resistant to high temperatures.

The grooves, typically having a width from 0.4 to 1 mm, are usually produced by machining. However, this method has the disadvantage of exposing the fibers of the fibrous reinforcement present within the CMC sector, which leads to accelerated corrosion and/or oxidation of the part thus subjected to high temperatures.

However, due to their large depth compared to their reduced width, it is difficult, if not impossible, to deposit a protective coating at the bottom of the grooves by means of thermal spraying.

In addition, the machining within the fibrous reinforcement of the ring sector implies that the surface condition of the inner walls of the grooves is quite uneven, with in particular an arithmetic average roughness Ra greater than 6 μm, which results in seal defects between the metal tabs and the ring sectors.

There is therefore a real need for a method for manufacturing a CMC part as well as such a CMC part, which are at least partly devoid of the drawbacks inherent in the aforementioned known method.

PRESENTATION OF THE INVENTION

This present disclosure relates to a method for manufacturing a CMC part provided with at least one cutout, comprising the following steps:
  providing a fibrous reinforcement,
  forming a cavity in a portion of the fibrous reinforcement,
  injecting a slip comprising at least a ceramic powder and a solvent, the slip being injected so as to impregnate the fibrous reinforcement and to fill the cavity of the fibrous reinforcement,
  drying the obtained assembly,
  carrying out a densification by infiltration of a liquid densification material and solidification of said densification material,
  machining at least one cutout in the obtained blank within the volume corresponding to the cavity of the fibrous reinforcement.

Thus, in such a method, the slip is injected both into the fibrous reinforcement and into the volume of the cavity formed in the fibrous reinforcement. Consequently, after drying and densification of the assembly, a blank is obtained having a first portion formed by the fibrous reinforcement embedded in the ceramic matrix and a second portion, located within the cavity of the reinforcement, formed by ceramic matrix without reinforcement.

Consequently, the volume located within the cavity of the fibrous reinforcement is totally devoid of fibers: it is therefore possible to machine this second portion easily and without constraints, without exposing fibers of the fibrous reinforcement. This reduces the risk of corrosion and/or oxidation of the part, which increases its service life and reduces the recourse to maintenance.

In addition, in the absence of woven fibers, the structure of the second portion of the blank is more homogeneous than the first portion, which allows obtaining a more even surface condition during the machining of the cut-out of the final part. This gives better contact between an element inserted in the groove (a sealing tab for example) and the latter, which allows reaching for example a higher sealing level.

In the present disclosure, the terms "axial", "radial", "tangential", "internal", "external" and their derivatives are defined with respect to the main axis of the turbomachine; it is meant by "axial plane" a plane passing through the main axis of the turbomachine and by "radial plane" a plane perpendicular to this main axis; finally, the terms "upstream" and "downstream" are defined with respect to the circulation of air in the turbomachine.

In some embodiments, the fibrous reinforcement is made by weaving, preferably by 3D-weaving. The 3D-weaving allows in particular obtaining fibrous reinforcements having complex geometries in one piece, thus ensuring very good mechanical resistance to the final part.

In some embodiments, the fibrous reinforcement comprises SiC fibers, preferably at least 50% of SiC fibers, more preferably at least 95% of SiC fibers. However, any type of ceramic fiber could also be used and in particular carbon fibers.

In some embodiments, during the slip injection step, the slip is injected so as to further fill a volume located on the surface of the portion of the fibrous reinforcement in which the cavity has been formed. This allows completely protecting the face of the part carrying the cutout, including on the edges of said cutout. Particularly, this allows better densification on the surface of this preform portion.

In some embodiments, the ceramic powder of the slip comprises SiC, preferably at least 50% of SiC, more preferably at least 95% of SiC. However, any type of ceramic powder could also be used and in particular B, $B_4C$, TiC, ZrC, BN, $Si_3N_4$, or even $TiSi_2$.

In some embodiments, the average diameter of the particles of the ceramic powder of the slip is comprised between 0.1 μm and 10 μm, preferably between 0.5 μm and 5 μm. The production of a green part portion formed exclusively of ceramic matrix, outside the fibrous reinforcement, is difficult because of the high porosity rate left in this portion of the green part after elimination of the solvent. Thus, before its densification, this second portion of the green part is very fragile and can easily crumble, crack or even completely detach from the first portion provided with the fibrous reinforcement, especially if this second portion extends not only within the cavity of the fibrous reinforcement but also on the surface thereof. Several parameters allow strengthening this second portion of the green part in order to reduce the risks of damage mentioned above: among these is the diameter of the particles of the ceramic powder. Thus, the inventors have found that the ranges of diameter proposed above facilitated the implementation of the present method.

In some embodiments, the diameter D50 of the particles of the ceramic powder of the slip is comprised between 0.5 and 2 µm. The distribution of the powder particles can be monomodal or bimodal.

In some embodiments, the diameter d10 of the particles of the ceramic powder of the slip is greater than 0.1 µm.

In some embodiments, the diameter d90 of the particles of the ceramic powder of the slip is less than 4 µm.

In some embodiments, the solvent of the slip is an aqueous solvent.

In some embodiments, the slip comprises an organic binder. This binder allows a better resistance of the slip then of the second portion of the green part obtained following the drying of the slip: this in particular facilitates the demolding of the green part then its handling without damage.

In some embodiments, said organic binder comprises at least one of the following compounds: polyvinyl alcohol (PVA); polyvinylpyrrolidone (PvP); polyethylene imine and polyethylene glycol (PEG). These various compounds indeed substantially increase the resistance of the green part.

In some embodiments, the mass concentration of said organic binder relative to the powder mass is comprised between 0.5 and 10%, preferably between 1 and 5%. Such concentrations ensure good efficiency to the binder and therefore good resistance of the green part.

In some embodiments, the slip further comprises a plasticizer and/or a dispersant. It can in particular be a plasticizer, or a binder, of the PVA, PEG or PvP type. A plasticizer increases the mechanical resistance of the ceramic green body material after injection: it allows lowering the viscosity of the slip and brings flexibility to the green material. As regards the dispersants, it may be bases having a pH comprised between 8 and 12, preferably between 9 and 11, for example of the tetraethylammonium hydroxide (TEAH), tetraethylammonium hydroxide (TMAH) or sodium hydroxide (NaOH) type, or electrosteric systems, for example of the polyetherimide (PEI) type. These dispersants allow keeping the particles suspended by electrostatic dispersion.

In some embodiments, at least one consumable is placed in the tooling containing the fibrous reinforcement during the slip injection step. Such consumable allows obtaining a predetermined surface condition in the area where it is placed. Various consumables can be used and in particular fabrics, elastomers and/or metal foils. Depending on the area of the tooling, the consumable may or may not be porous.

In some embodiments, the drying step comprises a lyophilization step. Such a lyophilization step allows reducing the risk of cracking of the second portion of the green part during the drying step. It also allows ensuring good cohesion between the first and second portions of the green part.

In some embodiments, the drying step comprises a controlled evaporation step with an increasing temperature ramp. Such controlled evaporation allows controlling the elimination of the solvent, thereby reducing the risk of cracking during the drying step.

In some embodiments, the drying step comprises a Deliquoring-type drying step during which the part is dried by application of a pressure gradient.

In some embodiments, the slope of the temperature ramp of the controlled evaporation step is comprised between 1 and 5° C./min.

In some embodiments, the temperature ramp of the controlled evaporation step ends with a final temperature comprised between 100 and 140° C., preferably between 115 and 125° C.

In some embodiments, the temperature ramp of the controlled evaporation step begins at an initial temperature comprised between 30 and 70° C., preferably between 45 and 65° C.

In some embodiments, the compaction rate of the ceramic powder outside the fibrous reinforcement at the end of the drying step is greater than 50%. The compaction rate corresponds to the material ratio relative to the volume of the considered part: it particularly reflects the porosity rate of the part. Such a compaction rate ensures sufficient resistance to the second portion of the green part.

In some embodiments, the densification material comprises Si, preferably at least 50% by mass of Si, more preferably at least 95% by mass of Si.

In some embodiments, the method further comprises a step of annealing and pre-sintering the ceramic powder after the slip injection step and prior to the densification step. This allows strengthening the resistance of the green part by creating connections between the particles of ceramic powder.

In some embodiments, the annealing and pre-sintering step is carried out at a temperature comprised between 1200 and 1600° C., preferably between 1300° C. and 1500° C., for a duration comprised between 30 min and 2 h, preferably between 45 min and 1 h 30.

In some embodiments, the annealing and pre-sintering step is carried out under neutral gas, for example under Argon.

In some embodiments, the cutout machined in the blank is a groove. However, it goes without saying that any other type of cutout can be envisaged, and in particular bores, notches, shoulders, cavities, marks etc. Several cutouts of different types can also be machined in the same blank.

In some embodiments, the groove machined in the blank has a width of less than 1 mm.

In some embodiments, the groove machined in the blank has a depth at least three times greater than its width.

In some embodiments, the arithmetic average roughness Ra of the inner walls of the cutout machined in the blank is less than 5 µm, preferably less than 2 µm. This allows an element inserted in the cutout to be applied more tightly against the wall of the cutout, thus ensuring a higher sealing level.

In some embodiments, the machining step is carried out by milling, grinding and/or electrical discharge machining.

In some embodiments, the method further comprises a step of depositing a protective coating on at least one face of the final part which is devoid of cutout.

In some embodiments, the face of the final part in which the cutout has been machined is devoid of protective coating. Such a coating is in particular made useless when the slip has been injected also on the surface of this face of the final reinforcement.

In some embodiments, the method further comprises, before the slip injection step, an interphase deposition step provided to sheath the fibers of the fibrous reinforcement with an interphase material.

In some embodiments, the interphase deposition step is carried out via gas route.

In some embodiments, the interphase material comprises SiC and/or BN, preferably at least 50% of SiC, more preferably at least 95% of SiC.

In some embodiments, the method further comprises a preparation step. It can in particular be a sanding step or any other step which allows locally increasing the roughness of the surface of the part.

In some embodiments, said CMC part is an aeronautical part, for example a combustion chamber or turbine part. It can in particular be a turbine ring sector.

The present exposure also relates to a CMC part, provided with at least one cutout, obtained using a method according to any one of the preceding embodiments.

The present disclosure further relates to a turbine, comprising a ring including at least two ring sectors, each provided with a groove on each of its tangential end faces, and a sealing tab engaged in the grooves of two consecutive ring sectors, wherein at least one of said ring sectors is a CMC part according to any one of the preceding embodiments.

The present disclosure also relates to a turbomachine comprising at least a CMC part or a turbine according to any one of the preceding embodiments.

The aforementioned characteristics and advantages, as well as others, will emerge upon reading the following detailed description of exemplary embodiments of the proposed method. This detailed description refers to the appended drawings.

BRIEF DESCRIPTION OF THE DRAWINGS

The appended drawings are schematic and aim above all at illustrating the principles of the invention.

In these drawings, from one figure (FIG) to the other, identical elements (or parts of elements) are identified by the same reference signs. In addition, elements (or parts of elements) belonging to different exemplary embodiments but having a similar function are identified in the figures by numeral references incremented by 100, 200, etc.

DETAILED DESCRIPTION OF EMBODIMENT(S)

In order to make the invention more concrete, examples of methods are described in detail hereinafter, with reference to the appended drawings. It is recalled that the invention is not limited to these examples.

Figure 1:
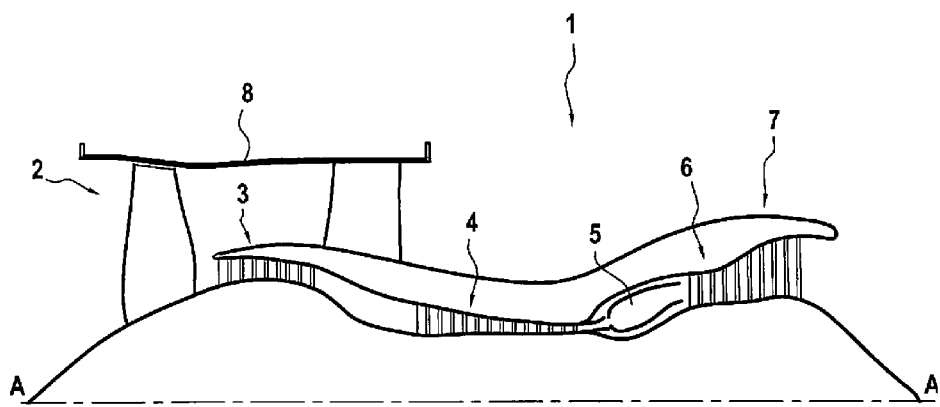
FIG. 1 is a sectional diagram of a turbomachine according to the present disclosure.

FIG. 1 represents, in cross-section along a vertical plane passing through its main axis A, a turbofan engine 1 according to the invention. It includes, from upstream to downstream according to the circulation of the air flow, a fan 2, a low-pressure compressor 3, a high-pressure compressor 4, a combustion chamber 5, a high-pressure turbine 6, and a low-pressure turbine 7.

Figure 2:
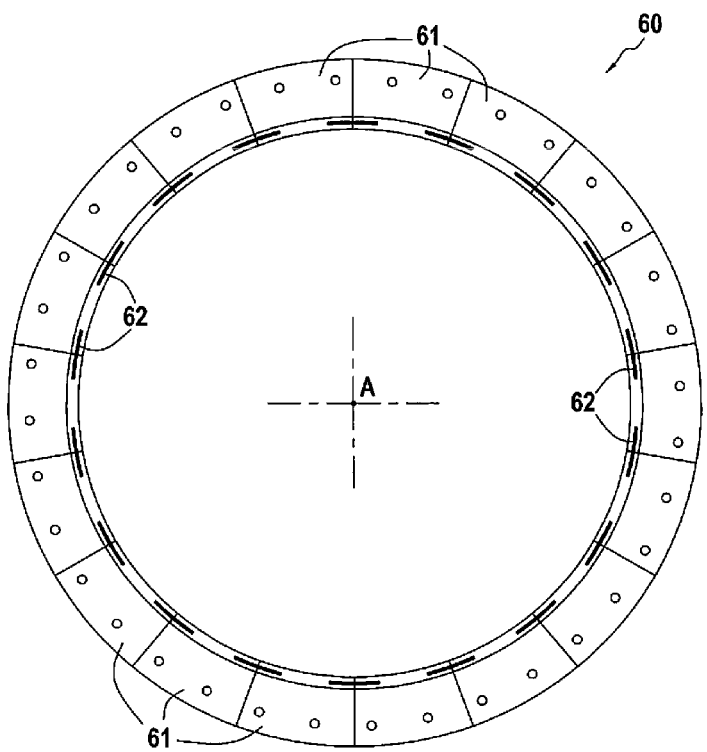
FIG. 2 is a schematic view of a sectorized turbine ring.

FIG. 2 illustrates the ring 60 of the high-pressure turbine 6 defining the external limit of the air flowpath within the high-pressure turbine 6. This ring 60 is divided into several substantially identical CMC sectors 61 connected by metal sealing tabs 62.

Figure 3:
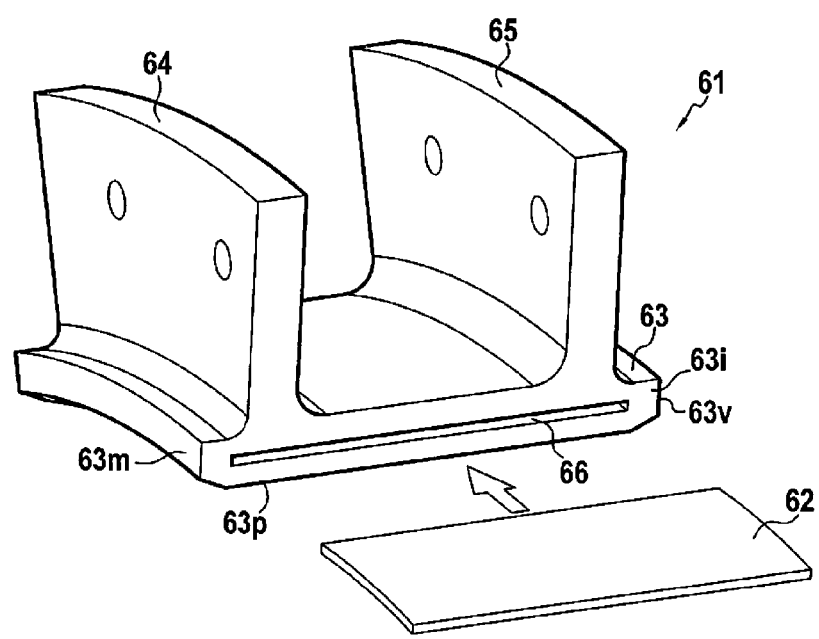
FIG. 3 is a perspective view of a ring sector according to the present disclosure.

FIG. 3 illustrates such a sector 61: it comprises a flowpath wall 63, an upstream flange 64 and a downstream flange 65. The flowpath wall 63, having the shape of a cylinder sector, is configured to form together with the other sectors 61 a cylindrical ring of axis A. The flowpath wall has a main inner face 63$p$, intended to delimit the air flowpath, an upstream end face 63$m$, a downstream end face 63$v$ and two intersector lateral faces 63$i$.

A groove 66 is formed in each intersector face 63$i$. These grooves 66, extending axially over practically the entire length of the flowpath wall 63, have in this example a depth of 3 mm and a width of 0.5 mm. The inner walls of the grooves 66 have an average arithmetic roughness Ra of less than 1.6 μm.

The tab 62, made of a nickel or cobalt base alloy, has a length substantially equal to that of the groove 66 and a thickness slightly smaller than the latter in order to allow the insertion of the tab 62 in a groove 66.

Figure 4:
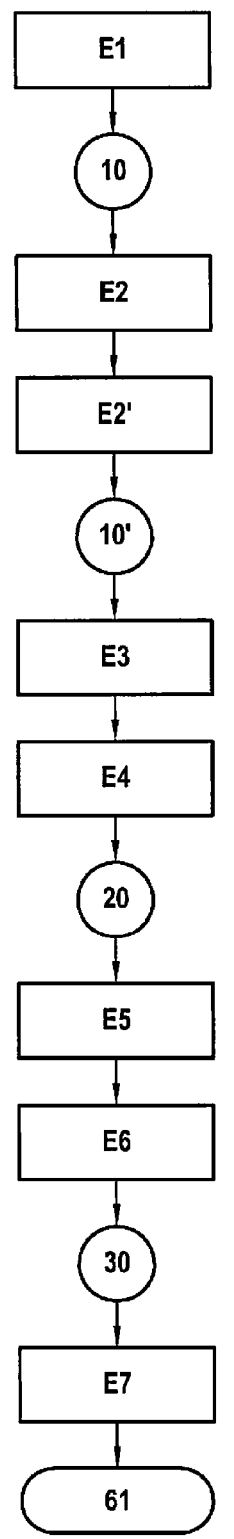
FIG. 4 illustrates the successive steps of a first example of a method according to the disclosure.
Figure 5:
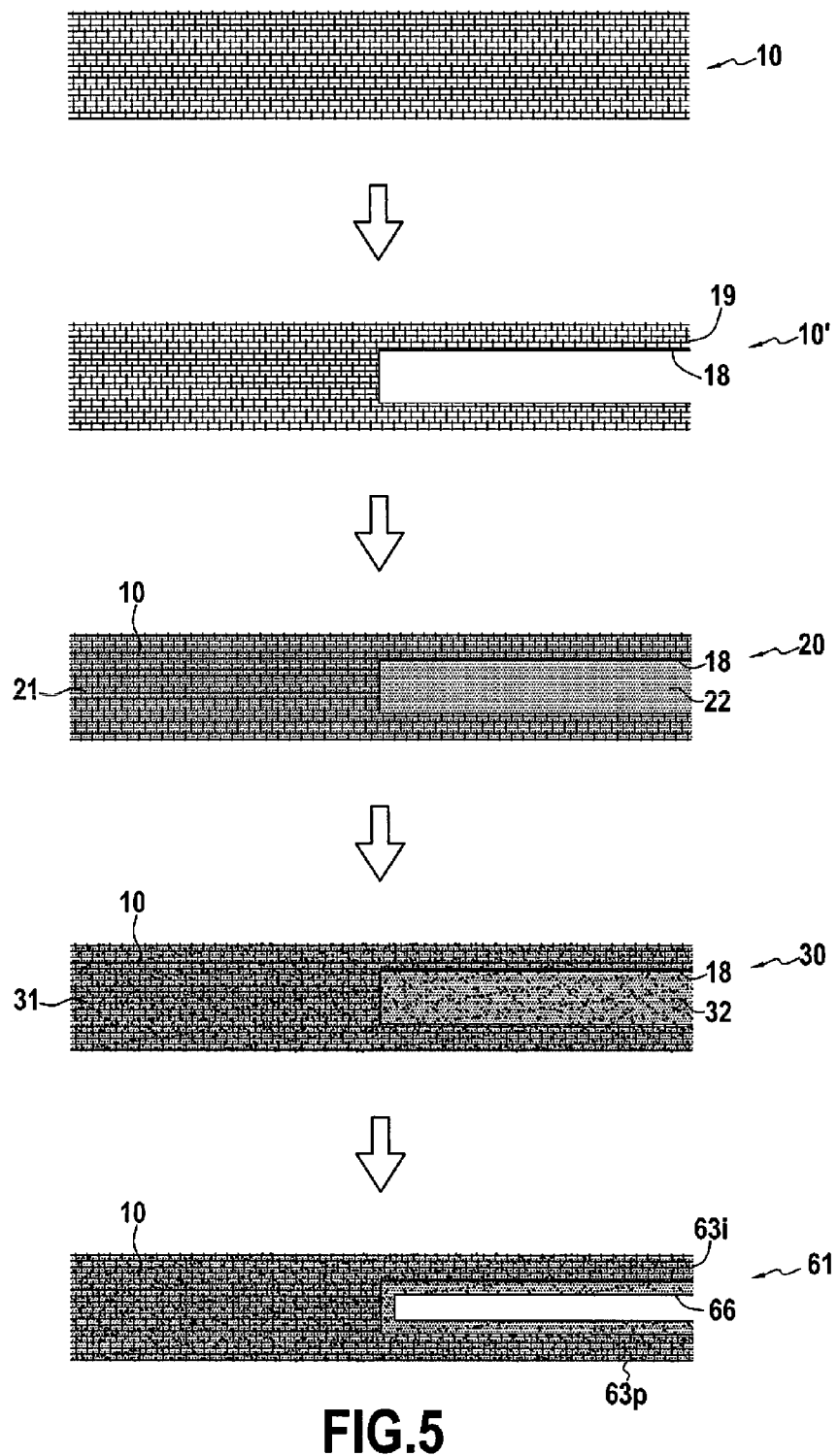
FIG. 5 illustrates the progression of the part during this first example of method.

FIGS. 4 and 5 illustrate the different steps of an example of method according to the exposure making it possible to manufacture such a CMC, i.e. ceramic matrix composite material, ring sector 61. Particularly, FIG. 5 is a schematic representation not taking into account the exact shape of the part.

The method begins with the weaving E1 of a fibrous preform 10 which will act as fibrous reinforcement of the sector 61. This preform 10 is preferably woven according to a 3D-weaving technique, known moreover, for example with an interlock-type weave. In this example, the preform 10 is woven with silicon carbide SiC fibers.

Once the preform 10 is finished, it is shaped and undergoes an interphase deposition step E2, also known, for example of the chemical vapor deposition (CVD) type. In this example, the interphase material deposited is silicon carbide SiC. A SiC sheath is therefore formed around the fibers of the preform 10, which consolidates the preform 10 and blocks the given shape during the shaping. At the end of this interphase deposition step E2, the fibers of the preform 10 are therefore coated with an interphase sheath but the preform 10 still remains very porous.

During a machining step E2', a trench 18 is carved in each lateral face 19 of the preform 10 corresponding to the intersector faces 63$i$ of the final sector 61. A consolidated and cut preform 10' is then obtained.

The consolidated and cut preform 10' is then transferred in a mold to undergo a ceramic slip injection step E3. In this example, the slip comprises a solvent, here water, a ceramic powder, here silicon carbide SiC, and an organic binder, here polyvinyl alcohol.

In this example, the concentration of the SiC powder in the slip is around 20% by volume. The concentration of the binder is for its part 1% by mass relative to the mass of the SiC powder in the slip.

The mold is provided for its part so as to match the shape of the preform 10' while leaving a free volume inside the trenches 18. Thus, when the slip is injected into the mold, it impregnates on the one hand the preform 10' and fills on the other hand the free volume inside the trenches 18 of the preform 10'.

A drying step E4 is then carried out to remove the solvent from the slip. In this example, it is a lyophilization step (also known as "freeze-drying"), during which the mold is suddenly brought to a negative temperature in order to solidify the solvent and then gradually heated at very low pressure so as to cause the sublimation of the solvent practically without altering the surrounding materials, the gas-phase solvent being then removed using a cold trap for example.

According to one variant, the drying step E4 could comprise a step of controlled evaporation of the solvent during which the temperature of the enclosure is gradually raised from 50 to 120° C. at the rate of an increase from 1 to 5° C./min, preferably 1° C./min.

According to yet another variant, the drying step E4 could comprise a Deliquoring step carried out under a pressure comprised between 50 and 100 mbar, for 1 to 2 hours.

During the drying step E4, within the preform 10', the ceramic particles of the slip decant and are deposited on the fibers of the preform as the solvent is removed, thus filling part of the porosities of the preform 10. Furthermore, within the free volume, the ceramic particles agglomerate and bond to each other under the effect in particular of the organic binder.

Thus, at the end of the drying step E4, a green part 20 is obtained having a first portion 21 provided with the reinforcement formed by the fibrous preform 10 and a second portion 22, within the trenches 18 and devoid of the fibrous reinforcement 10, consisting of agglomerated ceramic powder having a compaction rate greater than 50%.

The thus obtained green part 20 then undergoes an annealing and pre-sintering step E5 making it possible to strengthen the connections between the particles of the ceramic powder and therefore to strengthen the resistance of the green part 20, especially in its second portion 21.

In this example, the annealing occurs under neutral gas, for example argon, at a temperature of 1400° C. for 1 hour.

Once this step E5 is completed, the green part 20 is demolded and transferred to undergo a densification step E6. During this densification step E6, a liquid densification material, here silicon Si, is poured onto the green part 20: the densification material then penetrates by capillary action within the green part 20, whether in its first portion 21 or its second portion 22, and fills the residual porosities of the green part 20.

After cooling and solidification of the densification material, a blank 30 is obtained which no longer has, or practically no longer has, porosities. In a manner similar to the green part, the blank 30 has a first portion 31, provided with the reinforcement formed by the fibrous preform 10 and embedded in the matrix, and a second portion 32, located within the trenches 18, devoid of the fibrous reinforcement 10 and consisting exclusively of matrix.

It is then possible during a machining step E7, preferably by electrical discharge machining, to form the grooves 66 within the second portion 32, without starting the fibrous reinforcement 10, in order to obtain the final ring sector 61.

Naturally, other machining operations are also possible in the second portion 32 of the blank 30 without exposing the fibers of the fibrous reinforcement 10. In addition, some faces of the ring sector 61, and in particular the main inner face 63p, can receive a thermal coating. The intersector faces 63i are for their part preferably devoid of such a thermal coating.

Figure 6:
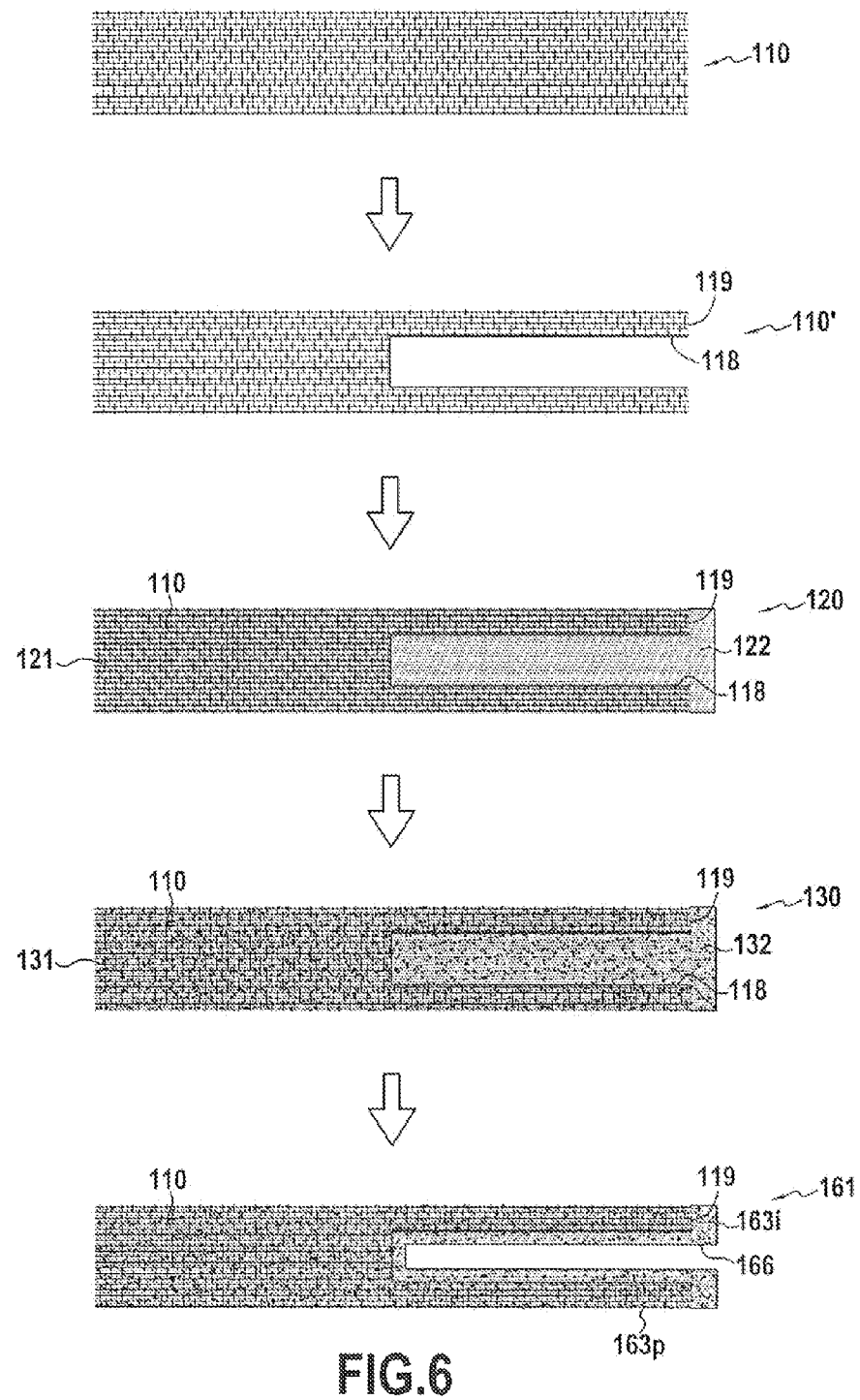
FIG. 6 illustrates the progression of the part during a second example of a method.

FIG. 6 illustrates a second exemplary embodiment of the proposed method. Only the differences with the first example will be described. Particularly, the succession of the different steps remains identical to that of FIG. 3, only the slip injection step E3 being implemented differently.

Thus, the method begins with the weaving E1 of a fibrous preform 110 similar to that of the first example. It undergoes an interphase deposition step E2 similar to that of the first example then a machining step E2' similar to that of the first example leading to obtaining a consolidated and cut preform 110' provided with trenches 118 made in each of its lateral faces 119.

The consolidated and cut preform 110' is then transferred in a mold to undergo a ceramic slip injection step E3. Similarly to the previous example, the slip comprises a solvent, here water, a ceramic powder, here silicon carbide SiC, and an organic binder, here polyvinyl alcohol, with identical concentrations.

On the other hand, the mold used has a shape different from that of the first example, it is indeed provided so as to match the shape of the preform 110' while leaving a free volume inside the trenches 18 but also on the surface of the lateral faces 119 of the preform. Thus, when the slip is injected into the mold, it impregnates on the one hand the preform 110' and fills on the other hand the free volume left inside the trenches 118 and in front of the lateral faces 119 of the preform 110'.

A drying step E4 is then carried out in a manner similar to the first example. Thus, at the end of the drying step E4, a green part 120 is obtained having a first portion 121 provided with the reinforcement formed by the fibrous preform 110 and a second portion 122, devoid of the fibrous reinforcement 110 and consisting of agglomerated ceramic powder with a compaction rate greater than 50%. The main surfaces 119 of the preform 110 are then located at the interface between these first and second portions 121, 122 of the green part 120.

The green part 120 thus obtained then undergoes an annealing and pre-sintering step E5 similar to the first example. Once this step E5 is completed, the green part 120 is demolded and transferred to undergo a densification step E6 similar to the first example.

After cooling and solidification of the densification material, a blank 130 is obtained which no longer has, or practically no longer has, porosities. Similarly to the green part, the blank 130 has a first portion 131, provided with the reinforcement formed by the fibrous preform 110 and embedded in the matrix, and a second portion 132, devoid of the fibrous reinforcement 110 and consisting exclusively of matrix.

Particularly, since the main surfaces 119 of the preform 110 extended inside the green part 120, the densification at these lateral surfaces 119 could be complete and homogeneous, without side effect.

It is then possible during a machining step E7, preferably by electrical discharge machining, to form the grooves 166 within the second portion 132, without starting the fibrous reinforcement 110, in order to obtain the final ring sector 161.

In this second example, the matrix layers devoid of fibrous reinforcement obtained on the surface of the lateral faces 119 of the preform 110 allow protecting the intersector surfaces 163i of the final sector 161 without it being necessary to deposit a specific thermal coating therein.

Although the present invention has been described with reference to specific exemplary embodiments, it is obvious that modifications and changes can be made to these examples without departing from the general scope of the invention as defined by the claims. Particularly, individual characteristics of the different illustrated/mentioned embodiments can be combined in additional embodiments. Therefore, the description and the drawings should be considered in an illustrative rather than restrictive sense.

It is also obvious that all the characteristics described with reference to a method can be transposed, alone or in combination, to a device, and conversely, all the characteristics described with reference to a device can be transposed, alone or in combination, to a method.

The invention claimed is:

1. A method for manufacturing a CMC part provided with at least one cutout, comprising the following steps:
providing a fibrous reinforcement;
forming a cavity in a portion of the fibrous reinforcement;
injecting a slip comprising at least a ceramic powder and a solvent, the slip being injected so as to impregnate the fibrous reinforcement and to fill the cavity of the fibrous reinforcement;
drying the obtained assembly;
carrying out a densification by infiltration of a liquid densification material and solidification of said densification material; and
machining at least one cutout in the obtained blank within the volume corresponding to the cavity of the fibrous reinforcement,
wherein the arithmetic average roughness Ra of the inner walls of the cutout machined in the blank is less than 5 µm.

2. The method according to claim 1, wherein the fibrous reinforcement is made by 3D-weaving.

3. The method according to claim 1, wherein, during the slip injection step, the slip is injected so as to further fill a volume located on the surface of the portion of the fibrous reinforcement in which the cavity has been formed.

4. The method according to claim 1, wherein the cutout machined in the blank is a groove having a width of less than 1 mm.

5. The method according to claim 1, wherein the cutout machined in the blank is a groove having a depth of at least three times greater than its width.

6. The method according to claim 1, wherein the machining step is carried out by milling, grinding and/or electrical discharge machining.

7. The method according to claim 1, further comprising a step of depositing a protective coating on at least one face of the final part which is devoid of cutout; and
wherein the face of the final part in which the cutout has been machined is devoid of protective coating.

8. A method for manufacturing a CMC part provided with at least one cutout, comprising the following steps:
providing a fibrous reinforcement,
forming a cavity in a portion of the fibrous reinforcement,
injecting a slip comprising at least a ceramic powder and a solvent, the slip being injected so as to impregnate the fibrous reinforcement and to fill the cavity of the fibrous reinforcement,
drying the obtained assembly,
carrying out a densification by infiltration of a liquid densification material and solidification of said densification material, and
machining at least one cutout in the obtained blank within the volume corresponding to the cavity of the fibrous reinforcement,
wherein the machining step is carried out by milling, grinding and/or electrical discharge machining.

9. The method according to claim 8, wherein the fibrous reinforcement is made by 3D-weaving.

10. The method according to claim 8, wherein, during the slip injection step, the slip is injected so as to further fill a volume located on the surface of the portion of the fibrous reinforcement in which the cavity has been formed.

11. The method according to claim 8, wherein the cutout machined in the blank is a groove having a width of less than 1 mm.

12. The method according to claim 8, wherein the cutout machined in the blank is a groove having a depth of at least three times greater than its width.

13. The method according to claim 8, wherein the arithmetic average roughness Ra of the inner walls of the cutout machined in the blank is less than 5 µm.

14. The method according to claim 8, further comprising a step of depositing a protective coating on at least one face of the final part which is devoid of cutout; and
wherein the face of the final part in which the cutout has been machined is devoid of protective coating.

* * * * *